United States Patent [19]

McKernan

[11] Patent Number: 5,031,204
[45] Date of Patent: Jul. 9, 1991

[54] INTERACTIVE DIAGNOSTIC SYSTEM FOR CELLULAR TELEPHONES

[75] Inventor: Randolph W. McKernan, The Woodlands, Tex.

[73] Assignee: GTE Mobile Communications Service Corporation, Houston, Tex.

[21] Appl. No.: 479,822

[22] Filed: Feb. 13, 1990

[51] Int. Cl.$^5$ .......................................... H04M 11/00
[52] U.S. Cl. ........................................ 379/63; 379/59
[58] Field of Search ............................... 379/58-60, 379/63

[56] References Cited

U.S. PATENT DOCUMENTS

| | | | |
|---|---|---|---|
| 4,776,003 | 10/1988 | Harris | 379/59 |
| 4,797,947 | 1/1989 | Labedz | 379/60 |
| 4,827,499 | 5/1989 | Warty et al. | 379/59 |
| 4,887,265 | 12/1989 | Felix | 379/59 |
| 4,901,340 | 2/1990 | Parker et al. | 379/60 |
| 4,941,167 | 7/1990 | Cannalte et al. | 379/59 |
| 4,958,368 | 9/1990 | Parker | 379/59 |

*Primary Examiner*—Jin F. Ng
*Assistant Examiner*—Dwayne D. Bost
*Attorney, Agent, or Firm*—Dan Hubert

[57] ABSTRACT

A method and apparatus for an authorized user of a cellular mobile radiotelephone to easily obtain data and performance evaluation of the telephone, such as the electronic serial number (ESN), the mobile telephone number (MID), and transmitted audio information that permits evaluation of the voice modulation performance of the telephone. By calling a dedicated telephone number, an authorized operator, such as a cellular agent, can contact a computer with voice response capability, which is associated with the electronic mobile exchange (cellular switch). The computer then transmits to the agent a voice prompt requesting a password. Upon correct entry of the password, the computer initiates a trunk trace of the incoming call. The trunk trace identifies the ESN and MID for the telephone used to make the call. The computer reports that data to the calling party, via the cellular network. Having supplied the telephone user or agent with the data, the computer then prompts the agent to record a voice sample on the system for subsequent re-transmittal to the telephne. By evaluating the re-transmitted voice sample, the agent can evaluate the voice modulation capability of the telephone.

19 Claims, 10 Drawing Sheets

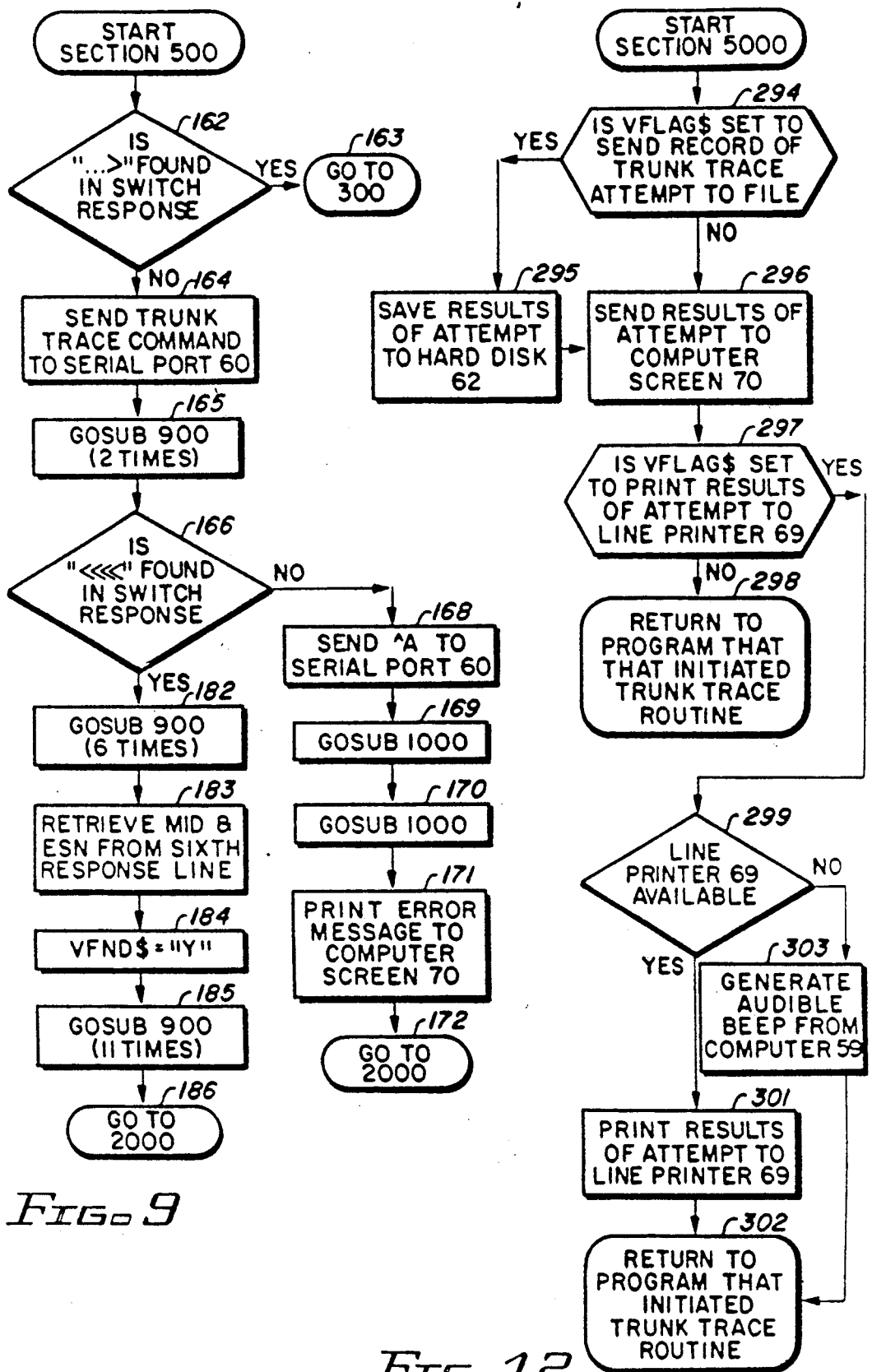

5,031,204

INTERACTIVE DIAGNOSTIC SYSTEM FOR CELLULAR TELEPHONES

BACKGROUND OF INVENTION

Field of Invention

The invention relates to cellular mobile radiotelephones. More particularly, the invention relates to a system for easily obtaining the electronic serial number (ESN) and mobile telephone number (MID) of a cellular telephone.

Each cellular telephone has a unique electronic serial number which resides within internal circuitry of the telephone, and serves to identify it to the cellular network. An invoice specifying the ESN of a cellular telephone usually accompanies its purchase. In addition, some telephones have the ESN printed on the handset. A few others are designed to provide a visual display of the ESN as it has been stored in the memory of the telephone, upon proper entry of a keystroke sequence on the keypad.

In addition, manufacturers of electronic test equipment currently produce two types of devices that can be used to extract the ESN and MID from a cellular telephone. The primary function of the first type of device is to program the numeric assignment module (NAM), and hence program or read the MID, of a cellular telephone. Currently, some manufacturers produce stand-alone machines. Others supply software which a personal computer uses to program a NAM by remotely controlling a standard EPROM programmer. Retrieving the ESN of a cellular telephone is an additional capability, besides programming the NAM, that some of these machines have.

However, with both types of devices, if removal of the NAM from the cellular telephone is required in order to program it, the ESN is not retrievable. Furthermore, operation of such devices requires hard-wiring between the device and the cellular telephone.

Another type of device which can be used to obtain the ESN and MID of a cellular telephone is used primarily to examine the electromagnetic transmissions of a cellular telephone. These devices receive and analyze the data transmitted by a cellular telephone, and can be programmed to extract the telephone's ESN and MID. Operation of such devices does not require hard-wiring between the device and the cellular telephone, but does necessitate sufficient proximity between the two, and a substantial number of technical modifications to the transmission analyzing device.

All of these devices are relatively expensive. Consequently, they are not widely available. Therefore, the ESN or the MID for a telephone is often not available, or becomes lost or misplaced, leaving the agent and/or user without easy access to the most important means for identifying and servicing the telephone.

Thus, when a user changes agents or has problems using his telephone in a cellular network, absence of the ESN or the MID can result in difficulty in providing prompt, satisfactory service. For example, when a user signs up with a new agent, the agent "activates" the telephone on the agent-carrier's cellular network, thereby authorizing its use for making calls. The activation process also involves entering the user's ESN into the system records of the carrier for billing and other purposes.

If this operation is not performed correctly, i.e. the ESN that the agent logs into the system does not match the telephone internal ESN, the cellular network will not permit the user to make calls. In most cases, a telephone that has been improperly activated with the carrier, by an agent, will merely receive a prerecorded general access denial message when the user attempts to place a cellular call. Presently, the denial messages of most carriers do not indicate a specific reason for denial. Consequently a user receiving such a denial message is not certain whether a faulty ESN or some other problem is the cause.

Therefore, before a user leaves the premises of an agent, after installation or service, both the user and agent need to know that the telephone is correctly activated. Moreover, if an activation is not correct, the agent needs an easy way to verify that the ESN is correct, the proper MID has been programmed into the phone, and know that some other problem must be addressed. Presently users, agents, and carriers have no easy, inexpensive means for determining or verifying the ESN or the MID of a cellular telephone.

In addition, a variety of technical problems can prevent a telephone from operating properly. Such problems may arise from factors relating to voice modulation/demodulation, radio frequency transmit/receive functionality, DTMF modulation, call processing capability, and battery power. Another need in the art is for an easy means for users, agents, or carriers to conveniently run performance tests on a telephone.

SUMMARY OF THE INVENTION

Accordingly, it is an object of the invention to provide cellular agents with authorized access to a system that will allow them to verify or identify the ESN and the MID for a cellular telephone.

It is a further object to provide agents with a system to verify that failed activation is not due to use of an incorrect ESN.

It is another object of the invention to provide agents with a system that permits agents to run simple performance tests of cellular telephones.

These objects and other features and advantages are attained in a system that enables an authorized agent to dial a dedicated telephone number. The system answers the call with a voice message, prompts the agent for a password, and admits the agent onto the system upon correct entry of the password.

Upon entry, the system conducts a trunk trace of the incoming call via the cellular switch to identify the electronic serial number and mobile telephone number of the calling telephone. The computer then transmits a voice synthesized message conveying the telephone's (ESN) and (MID) to the agent.

As a further option, the system provides a performance test routine in which the agent is prompted to speak test messages into the telephone. The system records and then retransmits the audio messages to the agent, thereby permitting evaluation of the voice modulation, voice demodulation, battery power, dual tone multi-frequency (DTMF) modulation, and radio frequency transmit functionality of the telephone.

Operation of the present invention provides a number of benefits to users of the system. First, the system is relatively inexpensive. Users need not purchase any hardware since one construction of the present invention facilitates all call requests by subscribers of the cellular network served by a particular cellular switch for which the system is installed. In order to install the system at a particular cellular switch, cellular carriers only need to purchase a relatively inexpensive assortment of hardware. Another benefit is the mobility that the present invention allows its users. Users can take advantage of the features of the system regardless of their proximity to its hardware as long as they conduct the call within the cellular network served by the cellular switch for which the system is installed. Another benefit is the uncomplicated manner in which the present invention interacts with its users. Unlike the prior art, no programming or special adaptation of complicated electronic equipment is required. By using the keypad of a standard cellular telephone, users can access all of the available features.

BRIEF DESCRIPTION OF THE DRAWINGS

FIG. 9 is a simplified flowchart of section 500 used by the trunk trace routine of the present invention.

FIG. 12 is a simplified flowchart of subroutine 5000 used by the trunk trace routine of the present invention.

DETAILED DESCRIPTION OF THE PREFERRED EMBODIMENT

Figure 1:
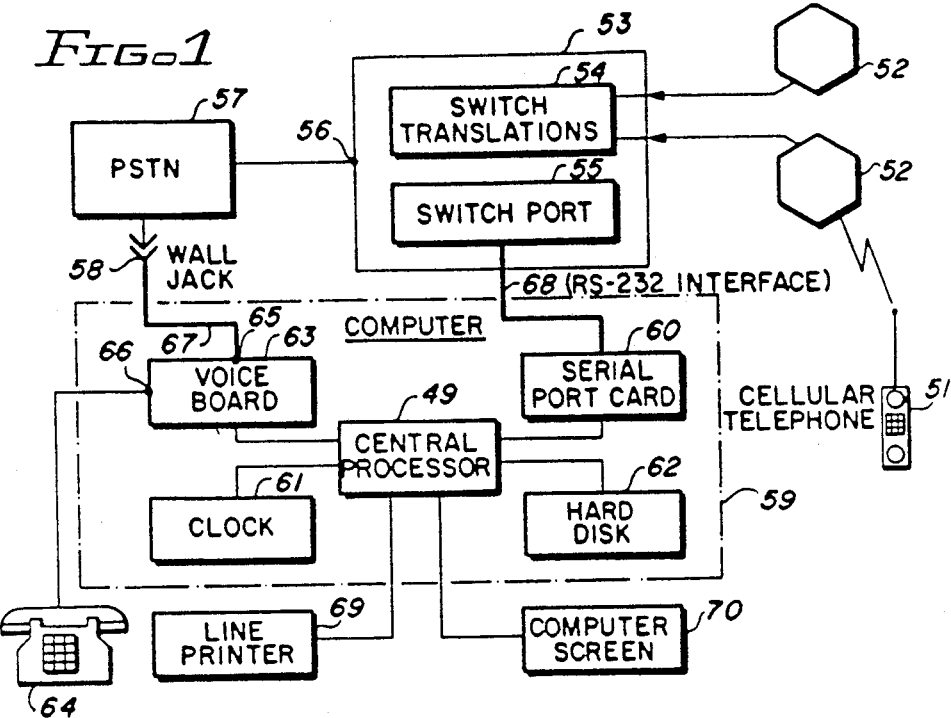
FIG. 1 is a drawing of the hardware interconnections of the present invention.

Referring now to the drawings, a preferred embodiment of the invention will be described. The invention enables an authorized cellular mobile radiotelephone user or agent to quickly obtain the ESN, MID, and other information on the operation of a cellular telephone.

The authorized agent starts by dialing a predetermined telephone number. The system answers the call with a voice message, prompts the agent for a password, and admits the agent onto the system upon correct entry of the password.

The system then searches for and transmits to the agent a voice synthesized message conveying the telephone's electronic serial number (ESN) and mobile telephone number (MID).

The system also provides the agent access to a diagnostic routine in which the agent is prompted to record a voice sample on the system. The system then returns the recorded voice sample, so the agent may evaluate voice modulation, voice demodulation, battery power, dual tone multi-frequency modulation, and radio frequency transmit functionality of the telephone.

Referring to FIG. 1, the hardware of the system can be divided into cellular equipment, telephone company equipment, and computing equipment.

The cellular equipment necessary to operate the invention comprises a cellular network having a plurality of cell sites 52 interconnected with an electronic mobile exchange (cellular switch) 53 as is commonly used in the cellular industry. Cellular switch 53 is equipped with a standard communication port (switch port) 55 and a direct outward dial trunk 56. Switch port 55 interfaces with a personal computer 59 via a standard RS-232 interface 68.

The single member trunk 56 can only dial outward. It thereby routes incoming calls to cellular switch 53 outward to PSTN 57. However, trunk 56 cannot receive calls from the PSTN 57. Techniques for configuring such a trunk on the Motorola EMX2500 switch (which is the cellular switch used in the preferred embodiment) are available in Motorola's document titled "Fixed Network Equipment EMX2500 ™, Digital Standard Practices For 25 Channel Systems" (part no. 68P81055E20-A), which is incorporated herein by reference.

The telephone company equipment includes PSTN 57, which serves to relay calls from the cellular switch 53 to the personal computer 59 in the same way that normal, landline telephone calls are routed.

The personal computer 59 is compatible with IBM PC/XT models and operates on version 2.0 or later of IBM-DOS. Contained within computer 59 are standard RS-232 serial port card 60, standard clock with battery backup 61, standard hard disk 62, and standard voice synthesis circuitry board (voice board) 63 each of which directly connects to a central processor 49 also contained within computer 59.

The serial port card 60 may comprise any of a variety of commercially available IBM PC/XT compatible serial port cards. To facilitate communications with computer 59, serial port card 60 is configured to be the first serial port, COM1, according to nomenclature common to the art of personal computing. This board 60 connects to switch port 66 through RS-232 cable 68.

The voice board 63 (part no. 8033) is made by Natural Microsystems ™. This board is configured as COM2, and contains a first 65 and a second 66 standard phone plug. A telephone line 67 connects first jack 65 to a wall jack 58, continuing on to couple with PSTN 57. This line should be a two wire circuit with a ringing voltage of approximately 100 Volts AC at 20 Hz. To second jack 66 attached a standard, single line telephone 64.

Natural Microsystems also provides a standard software package ("voice shell") with the purchase of the voice board 63. This software supports operation of voice board 63, and resides on hard disk 62 of computer 59 after installation thereon. Computer 59 runs the voice shell, which continually waits for an incoming telephone call. The system may handle only a single call at one time.

Upon receipt of an incoming call the voice shell initiates an application program. The application program includes a number of programming lines, referred to hereinafter as cards, which are shown in order of execution in Table I.

The application program performs a number of voice shell functions, and also initiates execution of a trunk search routine to identify the ESN and MID. After completion of the trunk search, the application program continues to completion.

Further understanding of the voice shell software is available by reference to the Watson TM Voice Information System TM reference guide (part no. 1154-00), which is incorporated herein by reference.

Figure 2:
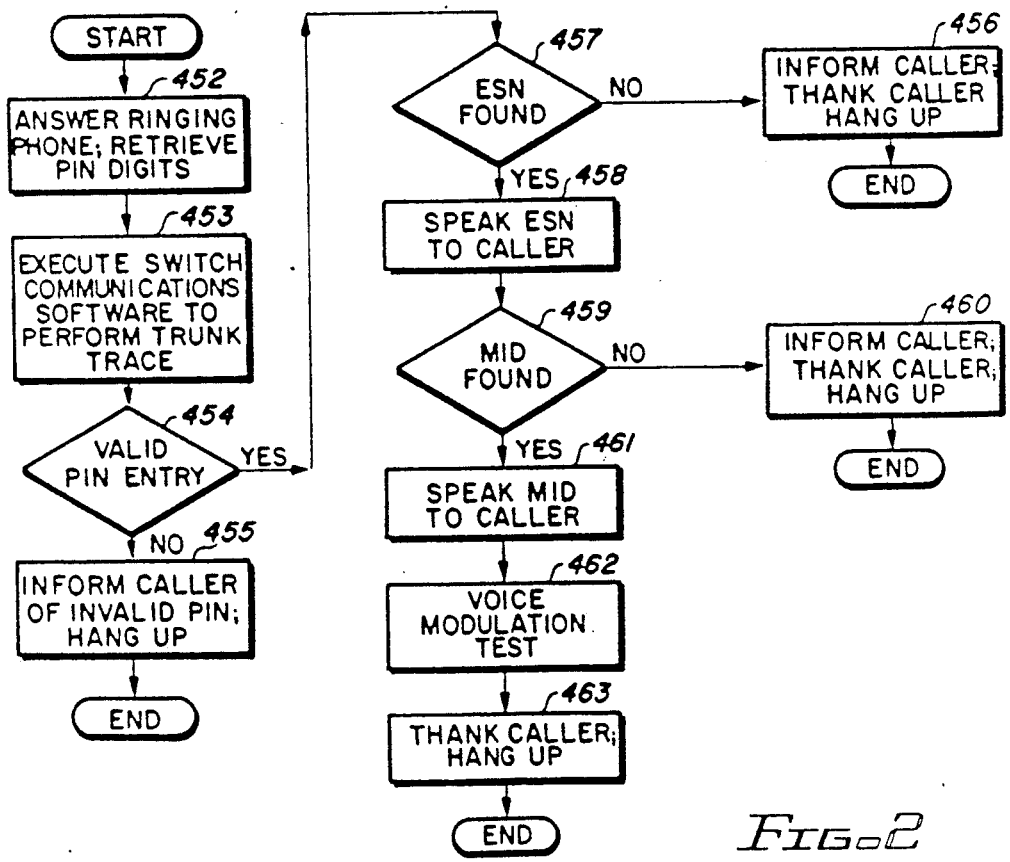
FIG. 2 is a block diagram of the overall operation of the present invention.

FIG. 2 generally illustrates the application program and sequence in which the present invention functions. Task 452 answers the ringing telephone line, using the voice shell, and accordingly executes the application program. The application program begins by retrieving one or more digits of a personal identification number (PIN) entered by the calling party. In task 453 control is passed to a trunk trace routine which will procure the ESN and MID of calling cellular telephone 51 from the local cellular switch. After completion of the trunk trace routine, control is returned to the application program. After completion of task 453, query 454 asks whether or not the PIN entry was valid. If task 453 determines that the PIN submitted by the calling party was invalid, task 455 proceeds to inform the calling party of the invalid PIN and hangs up.

Alternately, if task 453 found a valid PIN, query 457 asks whether the trunk trace performed in task 453 successfully obtained an ESN. If query 457 determines that no ESN was found, task 456 informs the calling party that the ESN was not found, thanks the calling party for accessing the system, and hangs up.

On the other hand, if query 457 determines that an ESN was found, then task 458 speaks the hexadecimal digits of the ESN to the calling party. Then, query 459 asks whether the trunk trace performed in task 453 successfully obtained a MID. If query 459 determines that no MID was found, task 460 informs the calling party that the MID was not found, thanks the calling party for accessing the system, and hangs up.

However, if query 459 determines that a MID was found, then task 461 speaks the digits of the MID to the calling party, and proceeds to task 462. Task 462 performs a diagnostic test by requesting the calling party to issue a voice sample, digitally recording that sample, and playing the sample back for receipt of the calling party.

Figure 3:
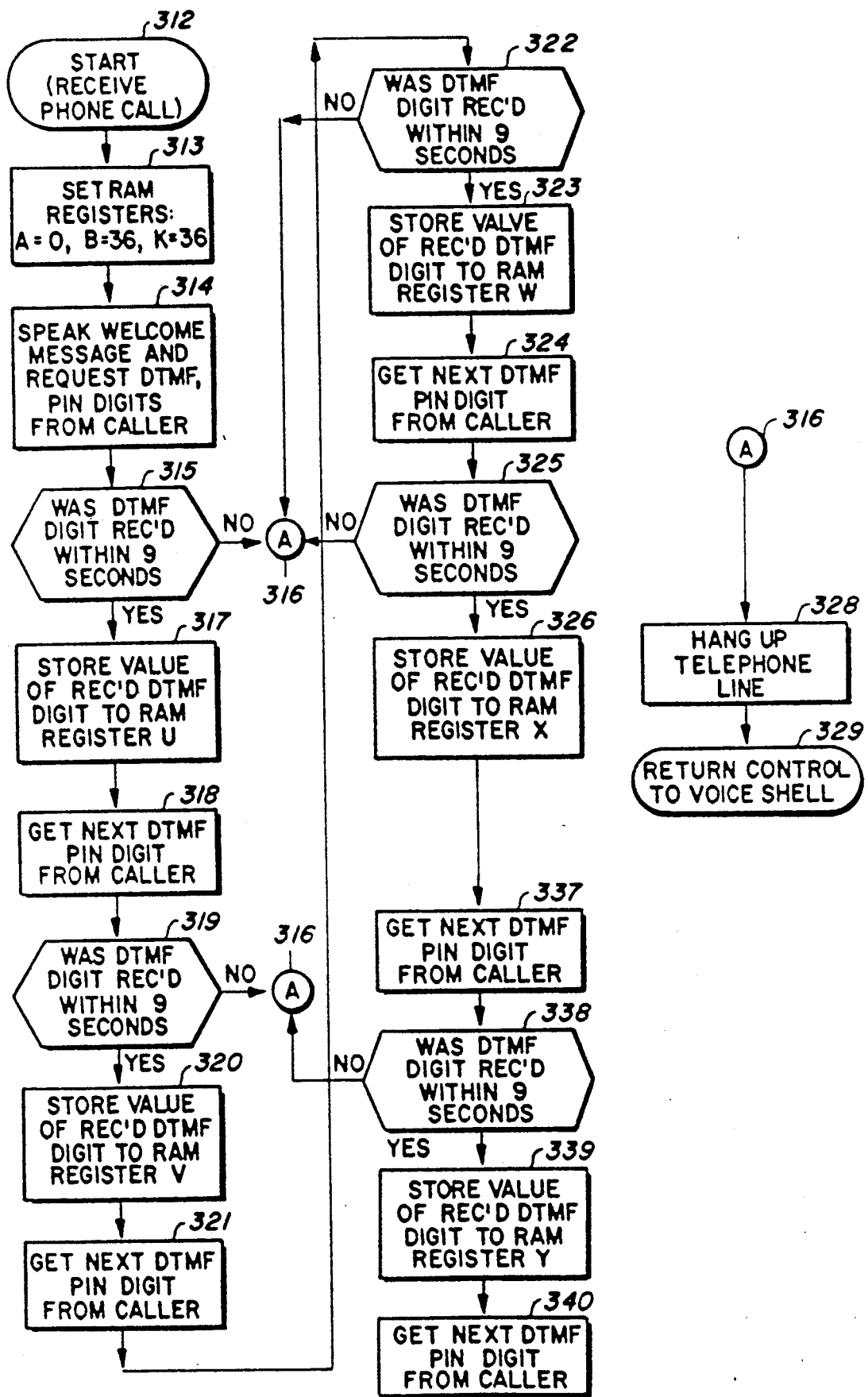
FIG. 3 is a simplified flowchart of the first part of a personal identification number (PIN) retrieval process used by the application program of the present invention.
Figure 4:
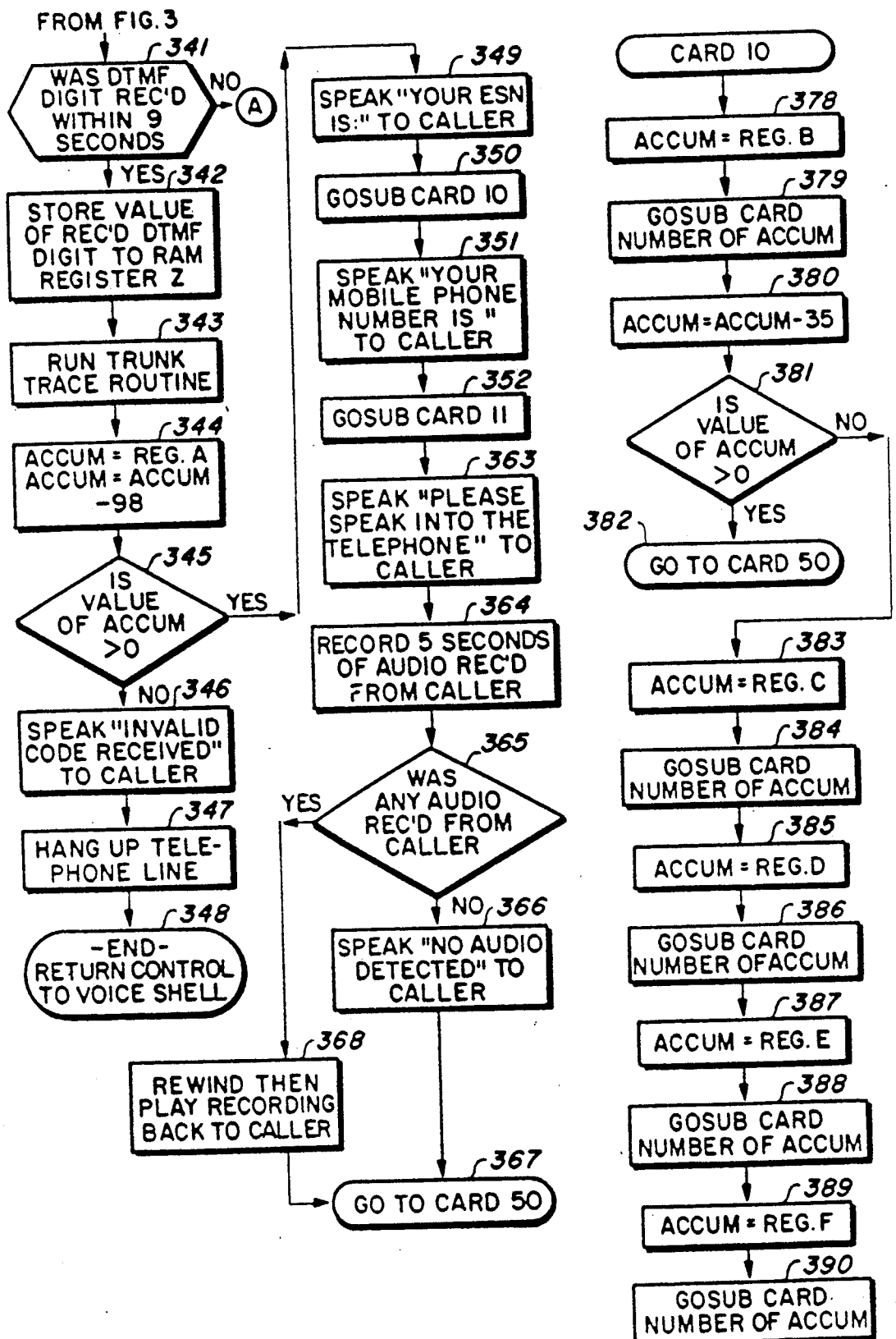
FIG. 4 is a simplified flowchart of the second part of the personal identification number (PIN) retrieval process, the trunk tracing routine process, the ESN/MID recitation process, and voice modulation diagnostic process as they are used in the application program of the present invention.
Figure 5:
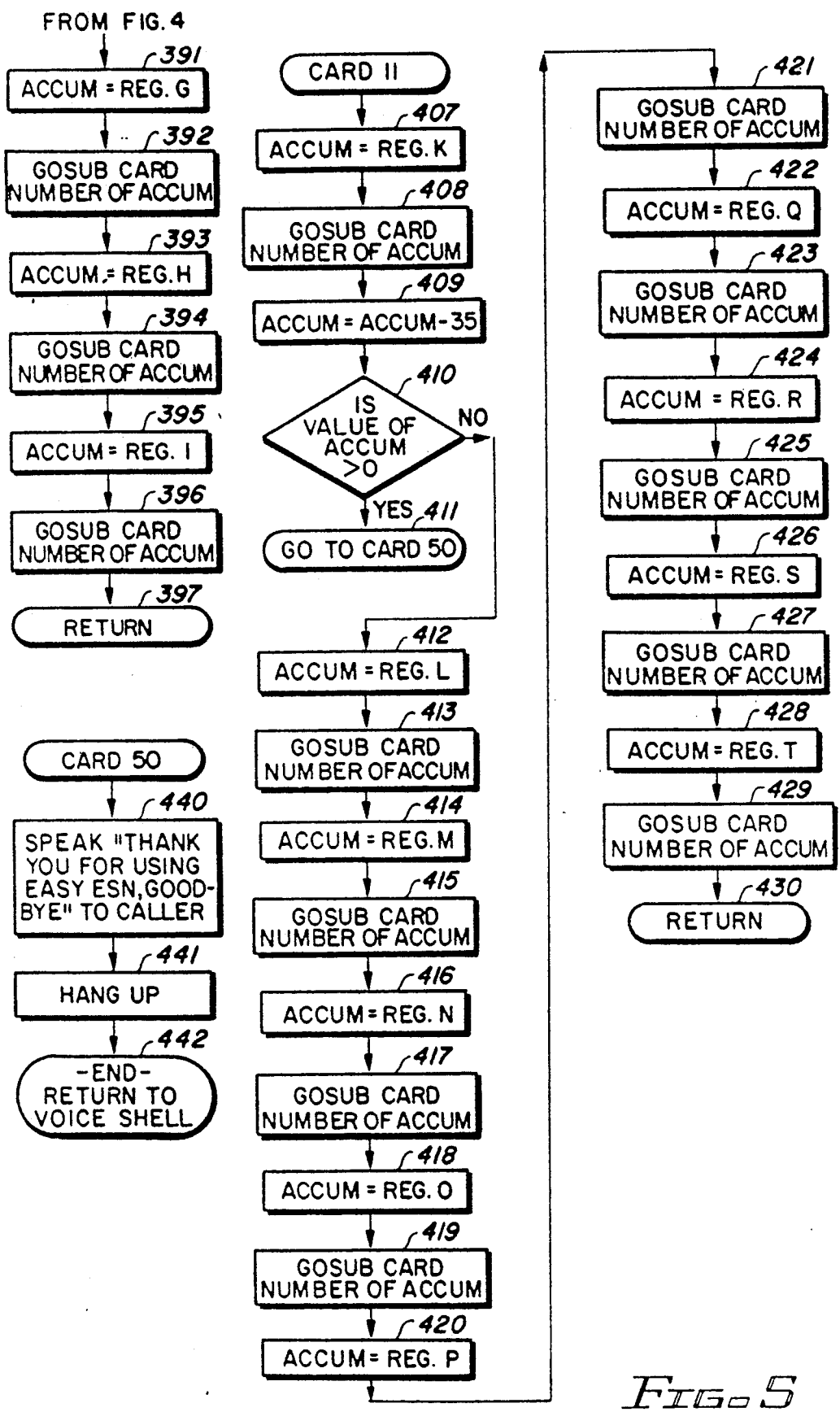
FIG. 5 is a simplified flowchart of the MID recitation and end sequence portions used in the application program of the present invention.

After completion of task 462, task 463 concludes the routine by issuing a "thank you" message to the calling party, hanging up, and returning control from the application program to the voice shell. FIGS. 3, 4, and 5 further illustrate the operation of the application program. In addition, Table I lists the individual statements of code which make up the application program. Referring now to FIG. 3, the beginning of the application program is illustrated. In task 312, the application program is initiated by the voice shell upon receipt of a telephone call.

Table II, presented below, illustrates the organization of several 2-byte RAM registers which are used in the exchange of data between the application program and the trunk trace routine.

TABLE II

RAM REGISTER ADDRESSES

| RAM Address | Content |
| --- | --- |
| A | Was a valid PIN received? (99 = Yes, 0 = No; preset to 0) |
| B through I | After determining the ESN digits and converting them to suitable format, the application program places the converted digits in these RAM registers. |
| K through T | After determining the MID digits and converting them to suitable format, the application program places the converted digits in these RAM registers. |
| U through Z | The application program stores the six PIN code digits here. |

Referring again to FIG. 3, task 313 presets RAM register A to 0, RAM register B to 36, and RAM register K to 36. Then, in task 314, voice board 63 speaks a welcome message and requests the caller to enter the six digit PIN using the keypad of cellular telephone 51. Query 315 determines whether the first DTMF digit is detected within nine seconds. If the answer to query 315 is negative, the program advances to task 316 for an early hang-up sequence which comprises task 328 of hanging up the telephone line and task 329 of returning control to the voice shell.

If the first digit was received within 9 seconds, as determined in query 315, task 317 stores the received digit in RAM register U. The program proceeds to task 318 which waits for the cellular telephone to enter the second digit of his/her PIN.

Query 319 determines whether the second DTMF was detected within nine seconds. If query 319 found proper entry of the DTMF digit, task 320 stores the digit in RAM register V. Alternately, if the answer to query 319 was negative, the program advances to query 316 for the early hang-up sequence.

The routine illustrated in FIG. 3 continues in FIG. 4. Referring to FIGS. 3 and 4 collectively, the software continues to advance in this same manner of waiting nine seconds for receipt of a digit (tasks 321, 324, 337, and 340) then alternately storing the digit (tasks 323, 326, 339, 342) in a RAM register or hanging up (task 316), until all six digits are received or no digit is received within the nine second limit.

Referring now to FIG. 4 individually, if the telephone holder successfully enters all six digits, the application program proceeds to task 343. Task 343 executes the trunk trace routine. The trunk trace routine will fill RAM register A depending upon whether or not the PIN received was valid, and store the telephone's ESN and MID in RAM registers B through I and K through T, respectively.

After completion of the trunk trace routine of task 343, the applications program proceeds to task 344. In task 344, the accumulator is filled with the contents of RAM register A minus 98. RAM register A is set to 99 by the trunk trace routine (shown later in task 110, FIG. 7) if the PIN solicited by the application program matches the list of valid PINs in the agent data file (shown in Table III). If query 345 does not find the value of the accumulator to be greater than zero, then a valid PIN was not received because RAM register A was preset to 0 to indicate receipt of no valid PIN (see FIG. 3, task 313), and 98 subtracted from 0 is not greater than 0. In this case, the voice board 63 executes task 346 which informs the telephone holder that the PIN received was invalid. Then, task 347 hangs up the telephone line, task 348 ends the application program, and control is returned to the voice shell.

On the other hand, if query 345 found the accumulator to be greater than zero, indicating entry of a valid PIN, the voice board 63 performs task 349. Task 349 speaks a message to the telephone user saying, "Your ESN is". After task 349, the task 350 calls upon the subroutine that begins at card 10 (described later). The subroutine that begins at card 10 pronounces "not found" and hangs up if the trunk trace was unsuccessful, or alternately pronounces the hexadecimal digits of the telephone's ESN and returns control to task 351.

In task 351, voice board 63 speaks to the telephone user saying, "Your mobile phone number is". Then, task 352 calls the subroutine that begins with card 11 (described later) which pronounces "not found" and hangs up if the trunk trace was unsuccessful, or alternately pronounces the hexadecimal digits of the telephone's ESN and returns control to task 363.

Task 363 begins a diagnostic test of telephone 51. In task 363, voice board 63 prompts the caller to speak into telephone 51. As soon as task 363 commences, voice board 63 (in task 364) starts recording a five second audio sample from the calling telephone 51.

Query 365 determines whether or not audio from the caller was received. If query 365 answers positively, task 368 causes voice board 63 to replay the recorded sample to the calling telephone. Otherwise, the system responds to the calling telephone in task 366 with a message indicating that no audio was detected. After task 366 or task 368, task 367 passes control of the application program to the routine at card 50 (shown in FIG. 5) in order to end the application program.

Still referring to FIG. 4, the subroutine that begins card 10, which was initiated by task 350, will be discussed. Generally, the subroutine that begins at card 10 pronounces "not found" if the trunk trace routine was unsuccessful in finding the ESN, or alternately speaks the hexadecimal digits of the telephone's ESN. This portion of the application program begins in task 378 by setting the accumulator equal to the contents of RAM register B.

RAM register B has particular importance since the applications program (see FIG. 3, task 313; presets RAM register B to 36 to indicate no ESN had been found. This value remains in RAM register B unless the trunk trace is successful in finding the ESN, whereupon values corresponding to the hexadecimal digits of the ESN are stored in RAM registers B through I (shown later). These values fall in a range from decimal 20 to 35. Following task 378, then, task 379 executes the subroutine that begins at the card having a number which matches the contents of the accumulator. Therefore, task 378 can call upon subroutines that begin with cards numbered 20 through 36.

Table IV, presented below, more fully explains these subroutines. Table IV matches the actual speech that the voice board 63 pronounces to the card numbers that begin subroutines that execute such pronunciation.

TABLE IV

| APPLICATION PROGRAM CARD NUMBERS | |
|---|---|
| Card Number | Word(s) pronounced |
| 20 | zero |
| 21 | one |
| 22 | two |
| 23 | three |
| 24 | four |
| 25 | five |

TABLE IV-continued

| APPLICATION PROGRAM CARD NUMBERS | |
|---|---|
| Card Number | Word(s) pronounced |
| 26 | six |
| 27 | seven |
| 28 | eight |
| 29 | nine |
| 30 | alpha |
| 31 | baker |
| 32 | charlie |
| 33 | delta |
| 34 | echo |
| 35 | foxtrot |
| 36 | not found |

Referring collectively to the list of Table IV and the instructions of FIG. 4, if the accumulator's value is 36 (preset value), task 379 will execute the subroutine that begins at card 36. Appropriately, when card 36 is called, it pronounces "not found".

On the other hand, task 379 calls upon cards 20 through 35, corresponding to the ESN's first hexadecimal digit, if the trunk trace routine properly found and placed the ESN in the RAM Referring now to FIG. 4 individually, task 380 subtracts from the contents of the accumulator. Then, task 381 compares the accumulator with 0. An accumulator value greater than 0 indicates that the trunk trace routine did not find the telephone's ESN and place it in RAM registers B thorough I, since all values of the converted numbers correspond to numbers from 20 to 35 (see Table IV). Suitably, task 382 proceeds to end the application program by calling upon the routine at card 50 (shown in FIG. 5).

But, if query 381 found the accumulator to be less than or equal to zero, the program continues by pronouncing the rest of the hexadecimal digits of the calling telephone's ESN, starting with the first character in task 383.

Task 383 places the contents of RAM register C, which corresponds to the second hexadecimal digit of the ESN, in the accumulator. Subsequently, task 384 pronounces that digit by calling the card number matching the contents of the accumulator.

Referring now to FIGS. 4 and 5 collectively, the program similarly progresses to fill the accumulator with the contents of RAM registers D through I (tasks 385, 387, 389, 391, 393, 395) and call the hexadecimal digit-pronouncing cards corresponding to the contents of the accumulator (tasks 386, 388, 390, 392, 394, 396) until the entire ESN has been pronounced to the telephone holder. After completing these tasks. Task 397 returns control to location in the main program from where the subroutine beginning at card 10 was called.

Turning now to FIG. 5, the subroutine beginning at card 11 is discussed. This subroutine functions analogously to the function of the subroutine that begins at card 10. When the subroutine that begins at card 11 is called by the application program (task 352 of FIG. 4), the subroutine pronounces "not found" if the trunk trace was unsuccessful, or alternately speaks the decimal digits of the telephone's MID.

Since the trunk trace routine (which was executed by task 343 in FIG. 4) places the telephone's MID in RAM registers K through T upon a successful trunk trace, the subroutine that begins at card 11 commences, in task 407, by filling the accumulator with the contents of RAM register K. Subsequently, task 408 calls the subroutine that begins with a card matching the number that task 407 retrieved from RAM register K.

This number may have been one corresponding to one of the subroutines that pronounce hexadecimal digits (cards 20 through 35) or the single card that pronounces "not found" (card 36). After task 408, task 409 subtracts 35 from the contents of the accumulator so that query 410 can determine whether or not the trunk trace routine successfully placed the MID into the RAM registers.

Hence, if the new accumulator contains a value greater than zero, then the contents of RAM register K are greater than or equal to 36 (the value which the trunk trace routine had preset into RAM register K), and therefore the MID was not successfully placed in the RAM registers. In this case, the program advances to task 411 which ends the application program and returns control to the voice shell by advancing to the routine at card 50.

On the other hand, if query 410 found the accumulator to be zero or less, the program proceeds to load the accumulator with the contents of RAM registers L through T (tasks 412, 414, 416, 418, 420, 422, 424, 426, and 428) and call the subroutines which start at cards having numbers corresponding to the contents of the accumulator (tasks 413, 415, 417, 419, 421, 423, 425, 427, and 429) until the entire MID has been pronounced to the telephone holder. After completing these tasks, task 430 returns control to point from where the subroutine that begins at card 11 was called.

Still referring to FIG. 5, the routing that begins at card 50 routine will be described. This routine completes the application program, and comprises several steps. First, task 440 issues an audio "thank you" message to the telephone. Next, task 441 hangs up the telephone line. Lastly, task 442 ends the application program by returning control to the voice shell.

Referring now to FIG. 1, the switch translation software resides within the cellular switch, and serves to route calls made to *ESN (or another predetermined number) through the cellular switch. The switch translation software routes these incoming calls out of the cellular switch through single member direct outward dial trunk group 56, and on to the subscriber line of computer 59.

Switch translations such as these are commonly performed in cellular telephone by persons of ordinary skill in this art. A publication that directs the construction of such switch translations (on the Motorola EMX2500 switch) is Motorola's "Fixed Network Equipment EMX2500 TM Digital Standard Practices For 24 Channel Systems" (part no. 68P81055E20-A).

Referring again to FIG. 1, the trunk trace routine comprises an executable file, resident of hard disk 62 of computer 59, and the routine communicates with the application program and the cellular switch.

Figure 6:
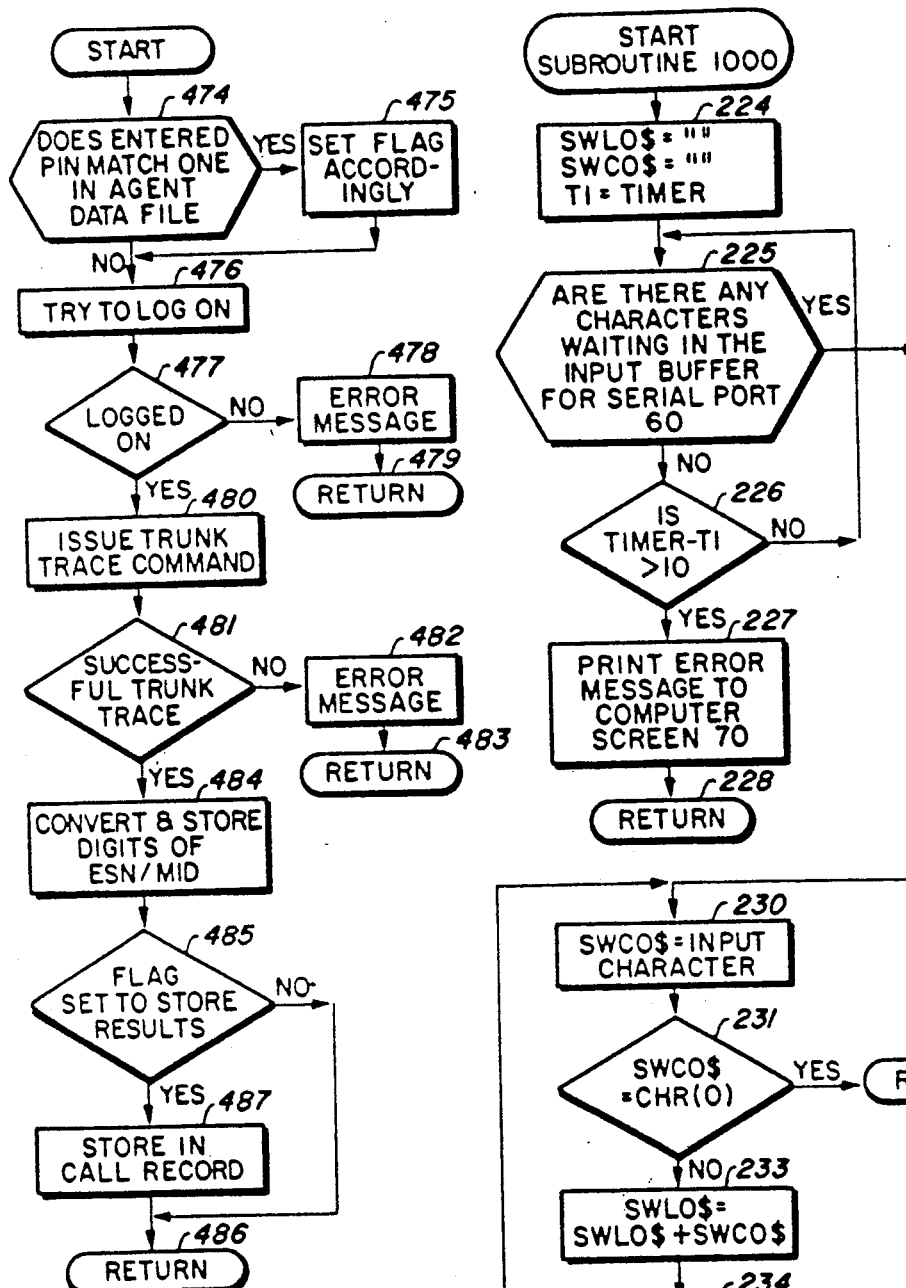
FIG. 6 is a block diagram of the trunk trace routine of the present invention.

FIG. 6 illustrates the simplified operation of the trunk trace routine. Referring now to FIG. 6, query 474 of the trunk trace routine determines whether the PIN solicited by the application program matches an entry in records of computer 59. If the PIN is valid, task 475 sets a flag accordingly and proceeds to task 476. The application program will subsequently use this flag in determining whether or not to report the results of the trunk trace to the telephone user. Otherwise, if query 474 finds an invalid PIN, the program advances directly to task 476.

Task 476 attempts to log-in to the switch, regardless of the validity of the received PIN. If query 477 finds that the log-in was unsuccessful, task 478 gives an error message and proceeds to task 479 which returns control to the application program.

On the other hand, if query 477 finds that the log-in was successful, task 480 issues a trunk trace command to the switch. Query 481 asks whether the trunk trace was successful. If the answer is negative, task 482 gives an error message and proceeds to task 483 which returns control to the application program.

However, if query 481 determines that the trunk trace has been successful, the software proceeds to task 484. Task 484 converts the hexadecimal digits of the ESN and decimal digits of the MID found by the trunk trace into card numbers (shown in Table IV), so as to be compatible with the application program. Task 484, in addition, stores the ESN and MID in the RAM registers B through I and K through 0, respectively.

If query 485 finds that a flag was set to store the results the trunk trace, then task 487 stores the call record accordingly and proceeds to task 486 where control is returned to the application program. Otherwise, if the result of query 485 was negative, the program proceeds to return to the application program in task 486.

FIGS. 7, 8, 9, 10, 11, 12, and 13, illustrate in more detail the operation of the trunk trace routine. In addition, Table V lists the individual statements of code which make up the trunk trace routine. This code is compatible with Microsoft TM QuickBASIC version 4.0 (part no. 00618). The code listed in Table V was designed for the Motorola EMX2500, but may be reconfigured for other Motorola switches without substantial difficulty and without exerting inventive effort by any member of ordinary skill in the art.

Figure 7:
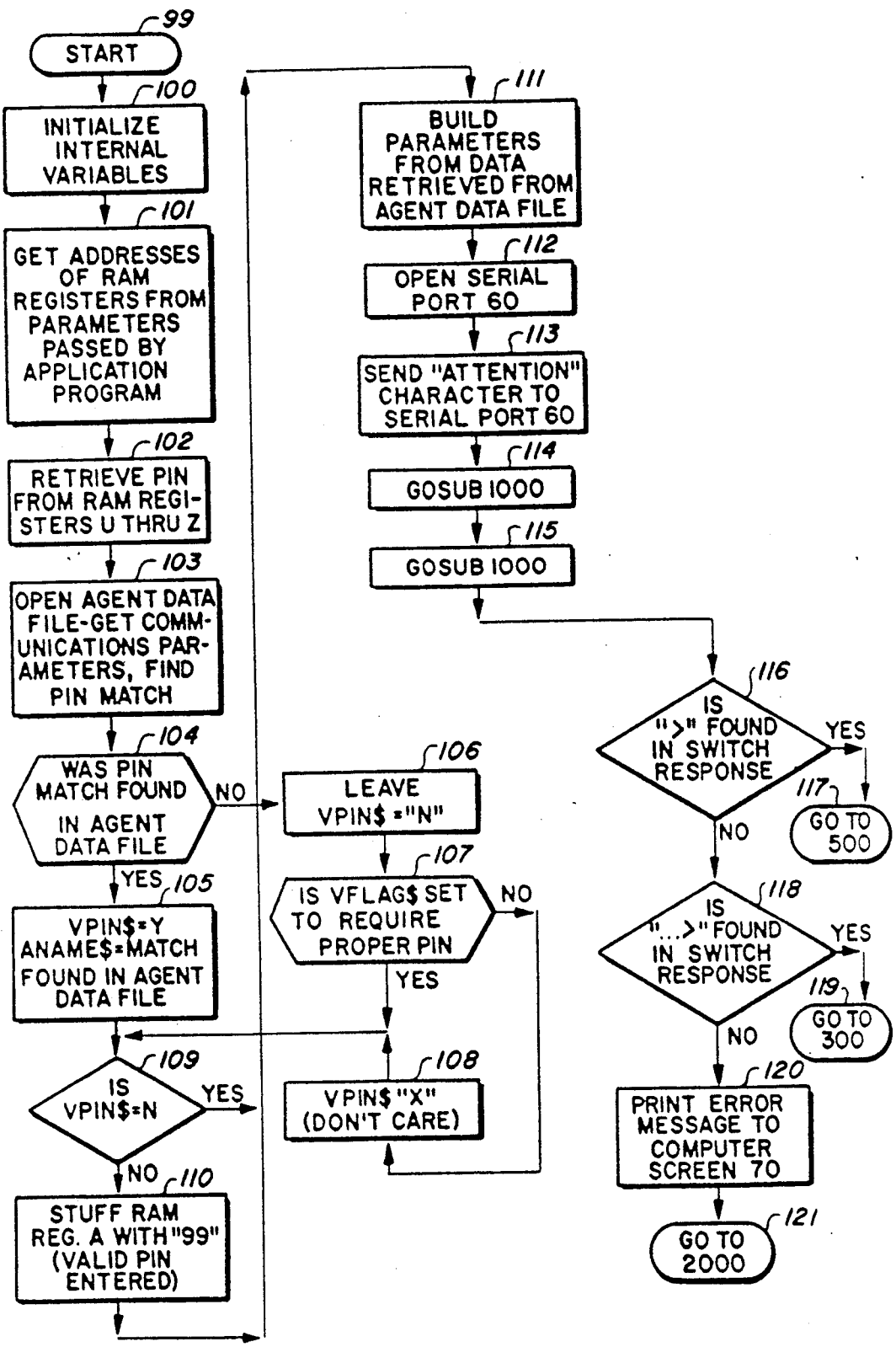
FIG. 7 is a simplified flowchart of the main program used by the trunk tracing routine of the present invention.

The trunk trace routine starts after being called by the application program in task 343 of FIG. 4. Referring now to FIG. 7, the detailed operation of the trunk trace routine will be shown. The starting position of the trunk trace routine is depicted by task 99. Next, task 100 initializes various internal variables. These variables and others employed in the trunk trace routine are described in Table VI.

Next, task 101 retrieves the address of a RAM location from parameters passed by the application program. This address corresponds to the beginning of a group of 2-byte RAM registers which are used in the exchange of data between the application program and the trunk trace routine. These RAM registers are shown in more detail in Table II (above).

Previously, when the telephone holder dialed the system, the application program executed task 31 (see FIG. 3) to prompt the telephone holder for a PIN. Tasks 317, 320, 323, 326, 339 and 342 (see FIGS. 3 and 4) then stored the digits of the PIN into RAM registers U through Z. In order to obtain this number, then, the trunk trace routine performs task 102 which retrieves the PIN from the RAM registers. Proceeding to task 103, the program opens the agent data file, retrieves various communications parameters, and attempts to find a match for the PIN submitted by the telephone holder.

Table III, presented below, represents a sample of the agent data file, which contains information that the trunk trace routine uses to check the validity of the PIN and to log-in to the cellular switch.

TABLE III

AGENT DATA FILE

| Line Number | Data |
| --- | --- |
| line 1 | PASSWORD, USERNAME |
| line 2 | TRUNK, FFFFFFSSTTTTTTBBBBBPDX |
| line 3 | PIN, Agent Name |
| line 4 | PIN, Agent Name |
| line 5 | PIN, Agent Name |
| line 6 | PIN, Agent Name |
| line 7 | PIN, Agent Name |
| line 8 | PIN, Agent Name |
| line 9 | PIN, Agent Name |
| line 10 | PIN, Agent Name |
| . | |
| last line | EOFEOF (end of file indicator) |

Referring to Table III, presented above, the agent data file will be described. The trunk trace routine retrieves, then uses the "password" and "username" of line 1 of the agent data file in order to log-in to the switch. The trunk trace routine performs a trunk trace on the circuit designated by the "trunk" variable of line 2. The character string following "trunk" in line 2 represents a series of flags and communication parameters. "FFFFFF" represents six yes/no flag positions, collectively called "VFLAG$". "SS" represents a two digit switch number and "TTTTTT" represents a type of switch. For serial port card 60, "BBBBB" represents the baud rate, "P" represents the parity setting, "D" represents the number of data bits, and "X" represents the number of stop bits.

Referring again to FIG. 7, the communications parameters, then, that the trunk trace routine retrieves in task 103 from the agent data file include the password username, trunk, various flags, and several communications parameters.

Query 104 asks whether or not the PIN submitted by the telephone holder matched any PINs located in the agent data file. If query 104 found a matching PIN in the agent data file, then task 106 sets VPIN$ to "Y" (representing that yes, a valid PIN number was in fact entered) and fills the string variable ANAME$ with the agent name from the agent data file corresponding to the matched PIN.

If query 104 searched the agent data file finding no matching PIN for the user-submitted PIN, then task 106 allows VPIN$ to remain equal to "N". But, if query 107 determines that the flag 1 of VFLAG$ is not set to require a proper PIN entry, then task 108 sets VPIN$ to "X" (representing that the trunk trace routine is indifferent to whether a telephone holder enters a correct PIN).

After task 108, after a positive answer to query 107, or after task 105, query 109 asks if an invalid PIN was submitted. If the answer to query 109 is negative, task 110 program places "99" in register A, signalling that the PIN entry is acceptable.

Next, task 111 arranges communications related data from the agent data file into parameters which will be used to communicate with the switch. These parameters are used in task 112, which configures and opens serial port 60 of computer 59 as COMI, to communicate with switch port 55. The program treats port 60 as a BASIC file.

As part of the process of opening communications with switch port 55, task 113 sends an attention character via the serial port 60. Tasks 114 and 115 solicit two responses from the switch by calling upon subroutine 1000 (described later). Basically, subroutine 1000 gathers one line of data, character by character, from switch port 55 each time it is called upon.

If query 116 finds the greater-than character (">") in the response gathered by tasks 114 and 115, then task 117 proceeds to section 500 (described later), which will confirm the log-in and execute the trunk trace command. Receipt of ">" may indicate that computer 59 is already logged in to the switch, because the switch issues ">" to prompt logged-in users.

If query 116 did not find (">") in the response, query 118 searches the response for ". . . >", which would indicate a prompt for computer 59 to log in. If query 118 finds ". . . >" in the response gathered by tasks 114 and 115 then task 119 passes control to section 300, which performs a log-in sequence. If ". . . >" was not found in the response, then an error has been detected I and task 120 sends an error message to computer screen 70 and task 121 passes control to section 2000.

Since this concludes the description of the main program portion of the trunk trace routine, the various subroutines and sections will now be described.

Figure 8:
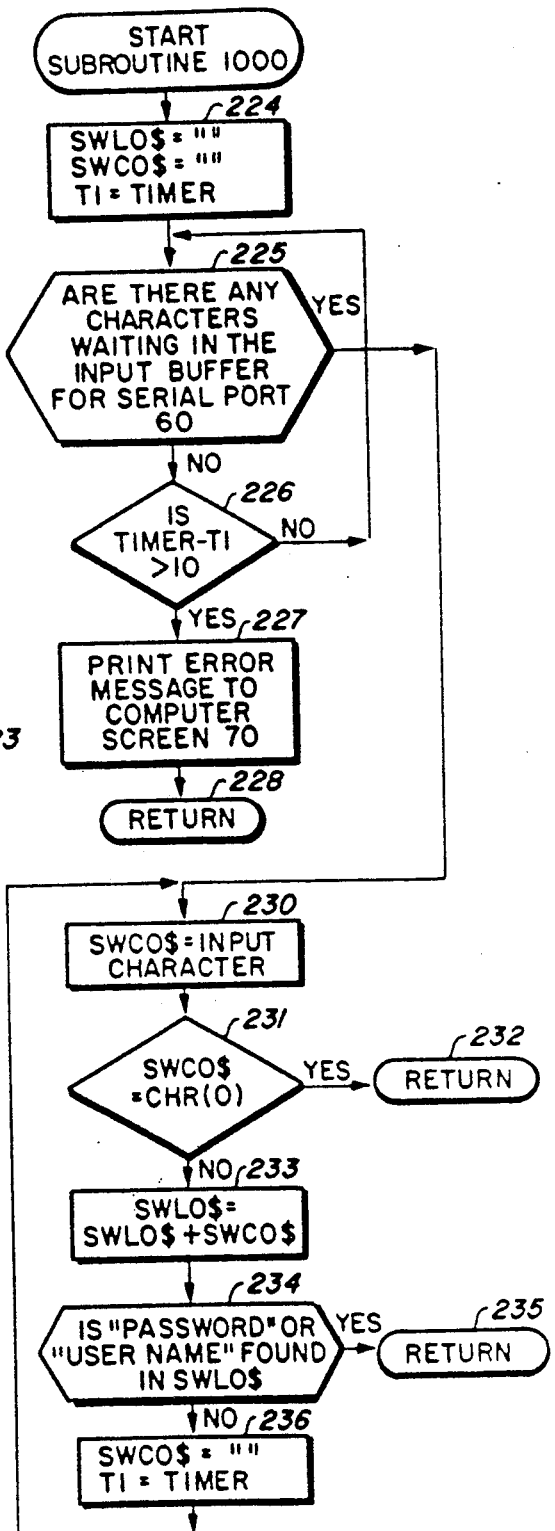
FIG. 8 is a simplified flowchart of subroutine 1000 used by the trunk trace routine portion of the present invention.

Turning to FIG. 8, subroutine 1000 of the trunk trace routine is shown. Each time the main program of the trunk trace routine calls subroutine 1000, it gathers one line of input from switch port 55. Task 224 clears the two variables (SWCO$ and SWLO$) used to store output from switch port 55 and marks the current time. Query 225 then determines whether or not there are any characters waiting in the input buffer for the serial port card ("input buffer"). As long as there are no characters present, and the timer has not advanced more than ten units past the prior sampling, the query 225 continues to search the input buffer for characters. When query 226 detects a timeout condition and an empty input buffer, task 227 sends an error message to computer screen 70 and task 228 returns control to the main portion of the trunk trace routine.

On the other hand, when query 225 detects one or more characters in the input buffer, task 230 sets the string variable SWCO$ equal to an input character. If query 231 finds this character to be a null character, the end of a line has been detected and task 232 returns control to the main portion of the trunk trace routine.

However, if query 231 determined that the character was not a null, task 233 appends the character to the contents of string variable SWLO$. In this way, SWLO$ collects the characters that make up an entire line of output.

If query 234 finds "password" or "username" in string variable SWLO$, task 235 returns control to the main portion of the trunk trace routine. Otherwise, task 236 resets SWCO$ to null and marks the time before extracting another character from the input buffer in task 230.

Referring to FIG. 9, section 500 of the trunk trace routine will described. This algorithm begins at query 162 by searching for the character string ". . . >", which is an indicator of an unsuccessful log-in. If query 162 finds the string ". . . >", task 163 jumps to section 300 to begin a new log-in attempt.

Alternately, if query 162 did not find the string ". . . >", task 164 issues the trunk trace command to the switch via serial port 60 and switch port 55 (shown in FIG. 1)..Task 165 gathers two lines of response from the switch, one line at a time, using subroutine 900 (described later).

Query 166 then asks whether or not "<<<<" is found in the lines of response from the switch. If the answer to query 166 was negative (indicating an unsuccessful trunk trace), task 168 sends a ⌃A (control-A) abort command to serial port 60. Then, tasks 169 and 170 retrieve two lines of response from the switch to clear the contents of switch port 55. Task 171 then prints an error message to the computer screen 70, and task 172 jumps to section 2000 (described later).

However, if query 166 finds the character string "<<<<" in the response procured by subroutine 900, then the trunk trace has been successfully completed, and task 182 places six calls to subroutine 900 in order to retrieve six response lines from the switch. Task 183 then retrieves the ESN and MID of the telephone that initially dialed *ESN, from the 'sixth response line. The ESN and MID are stored in the string variables SWESN$ and SWMID$, respectively (not shown). Then, task 184 sets the variable VFND$ to "Y", indicating that the telephone's ESN and MID have been found. Next, task 185 calls subroutine 900 eleven times to clear out the buffer of switch port 55, and task 186 jumps to section 2000.

Figure 10:
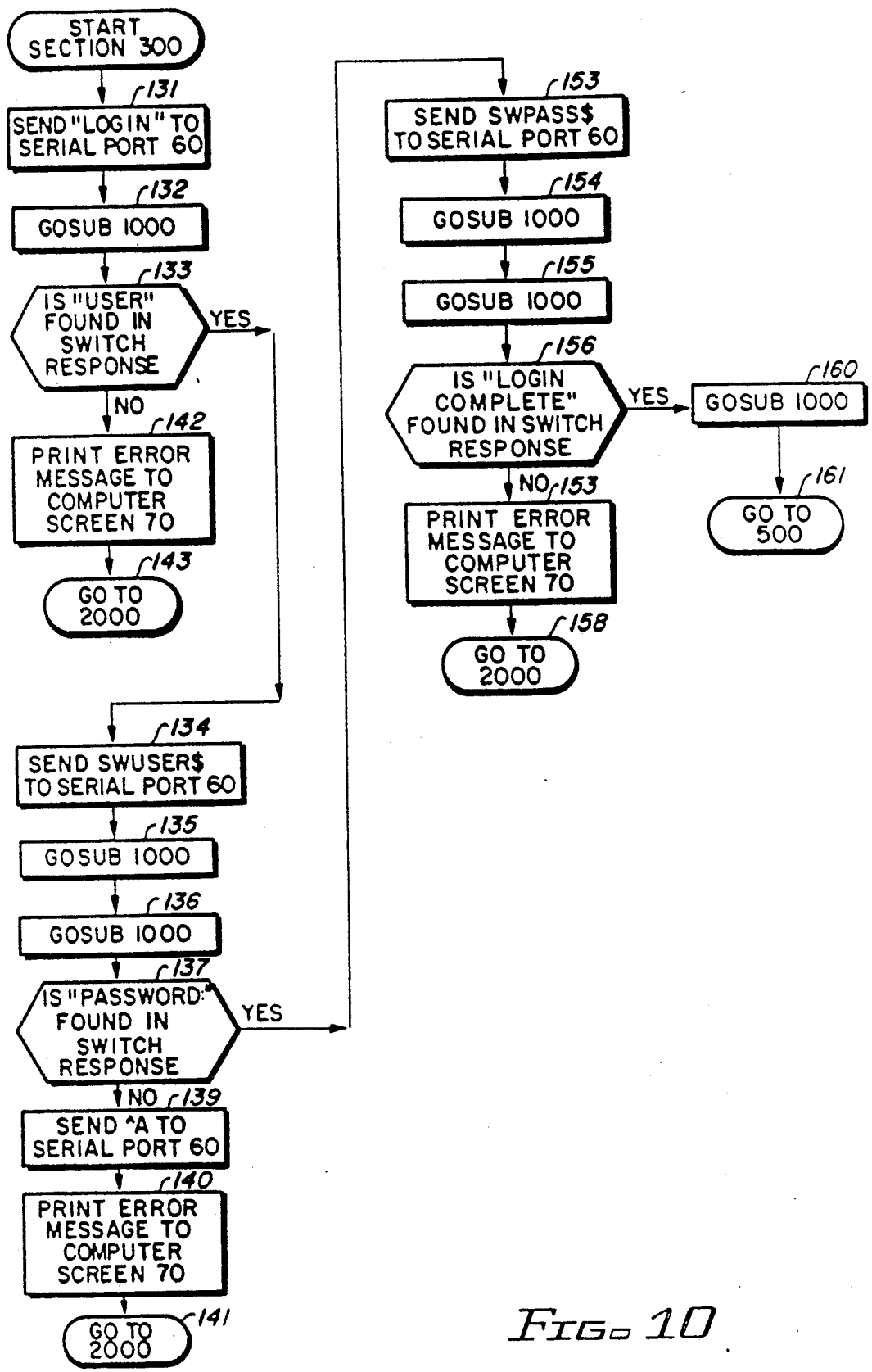
FIG. 10 is a simplified flowchart of section 300 used by the trunk trace routine of the present invention.

Turning to FIG. 10, section 300 will now be described. Basically, this algorithm performs a log-in sequence in order to log computer 59 in to the switch. First, task 131 sends "LOGIN" to serial port 60, in order to initiate the log-in procedure with the switch. Task 132 retrieves one line of response, using subroutine 1000. Query 133 then examines this response line for the character string "USER". The "USER" string indicates that the switch has prompted computer 59 for a "USER NAME" as part of the log-in process. If query 133 does not locate "USER" in the response line, task 142 prints an error message to computer screen 70 and then task 143 jumps to section 2000.

However, if query 133 detected "USER" in the response from the switch, task 134 sends the proper user name (previously stored in SWUSER$) to serial port 60 After tasks 135 and 136 each retrieve a response line from the switch, query 137 searches the latter response line for the character string "PASSWORD:". This would indicate that the switch has prompted computer 59 for a password during the log-in process. If query 137 finds that the response line does not contain a password prompt, task 139 sends ⌃A (control-A) to serial port 60 in order to discontinue the log-in process, task 140 prints an error message to computer screen 70, and task 140 passes control to section 2000.

On the other hand, if query 137 found the character string "PASSWORD:" in the response line from the switch, control is passed to task 153 which sends the contents of SWPASS$ (the password from the agent data file) to serial port 60. Then, tasks 154 and 155 retrieve two lines of response from the switch by calling upon subroutine 1000. If query 156 does not find the character string "LOGIN COMPLETE" in the last response line, then task 157 sends and error message to computer screen 70 and then task 158 jumps to section 2000.

Otherwise, if query 156 finds "LOGIN COMPLETE" in the response from the switch, task 160 calls subroutine 1000 to procure a line of response from the switch. Then, task 161 jumps to section 500 (described earlier).

Figure 11:
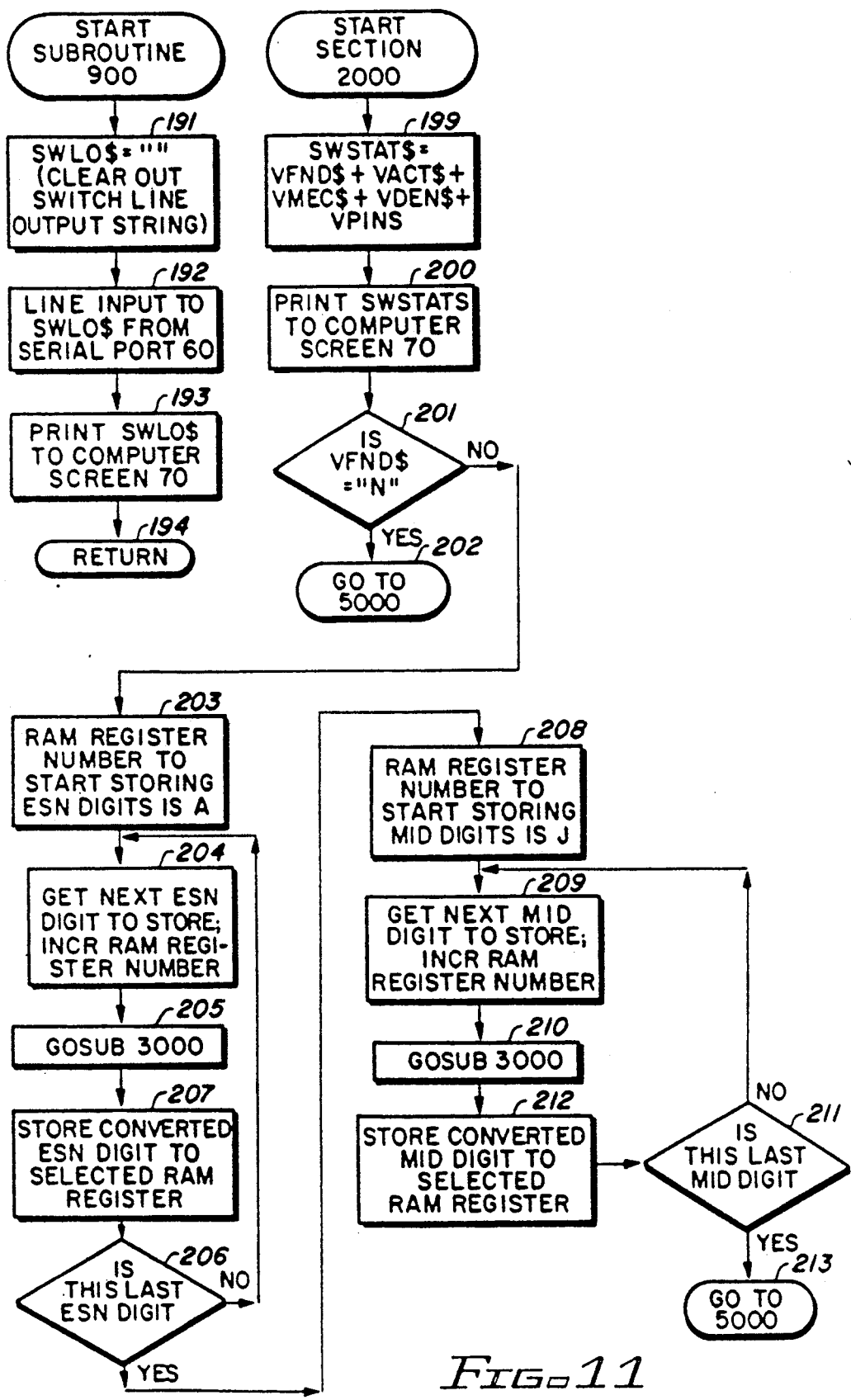
FIG. 11 is a simplified flowchart of subroutines 900 and 2000 used by the trunk trace routine of the present invention.

Referring now to FIG. 11, sections 2000 and 900 will be described. Basically, section 2000 serves to print the results of the trunk trace to computer screen 70, and to report these results to the application program.

First, task 199 assembles the switch status string (SWSTAT$) with information from the variable strings VFND$, VACT$, VMEC$, VDEN$, AND VPIN$ (described in Table VI). Next, task 200 outputs the values of SWSTAT$ to computer screen 70. If query 201 determines that the trunk trace did not yield the telephone holder's ESN and MID, then task 202 jumps to section 5000 to perform record keeping tasks and return control to the voice shell.

However, if query 201 determined that the trunk trace did yield an ESN and MID, task 203 sets a first pointer to RAM register A. Task 204 advances the first pointer once and sets a second pointer to the next ESN digit to be stored in RAM. Task 205 then calls upon subroutine 3000, which converts the retrieved hexadecimal digit into another number corresponding to one of the voice cards shown in Table IV. The main portion of the application program will later use the converted number to pronounce the original hexadecimal number to the telephone holder. After completion of task 205 (subroutine 3000), task 207 stores the converted ESN character to the proper RAM register.

If query 206 determines that the last ESN character has not been processed, task 204 repeats by advancing the first pointer to the next ESN digit and incrementing the second pointer to the next RAM register. In this manner, tasks 204, 205, and 207 and query 206 repeat until all of the characters of the ESN have been converted and stored in RAM registers.

When query 206 determines that all of the ESN digits have been processed, tasks 208, 209, 210, 212 and query 211 similarly cooperate to convert the digits of the retrieved MID and store them in RAM registers.

When query 211 determines that the last MID digit has been processed, task 213 jumps to section 5000 to perform record keeping tasks and return control to the voice shell.

Still referring to FIG. 11, subroutine 900 retrieves one line of input from switch port 55. First, task 191 clears the variable SWLO$ by setting it equal to null. Then, task 192 fills this variable with a line of input from the switch. Task 193 then prints this value to computer screen 70. Having completed the line input, task 194 returns.

Referring now to FIG. 12, section 5000 will be described. This algorithm outputs the results of the trunk trace to hard disk 62 and/or line printer 69 and returns control to the application program.

Query 294 determines if the fifth flag of VFLAG$ is set to "Y" If the answer is positive, task 295 saves the results of the trunk trace (or trunk trace attempt) to a call record on hard disk 62. Then, task 296 sends the trunk trace results to computer screen 70.

If query 297 finds that the fourth flag of VFLAG$ is not set to "Y", task 298 returns control to the application program. On the other hand, if query 297 finds that the fourth flag is set equal to "Y", task 299 checks the line printer's availability, and task 301 prints the results of the trunk trace (or attempt) to line printer 69 if available.

On the other hand, if task 299 finds line printer 69 was unavailable, task 303 generates an audible beep to signal this error condition. After task 301 or task 303, task 302 returns control to the application program.

Figure 13:
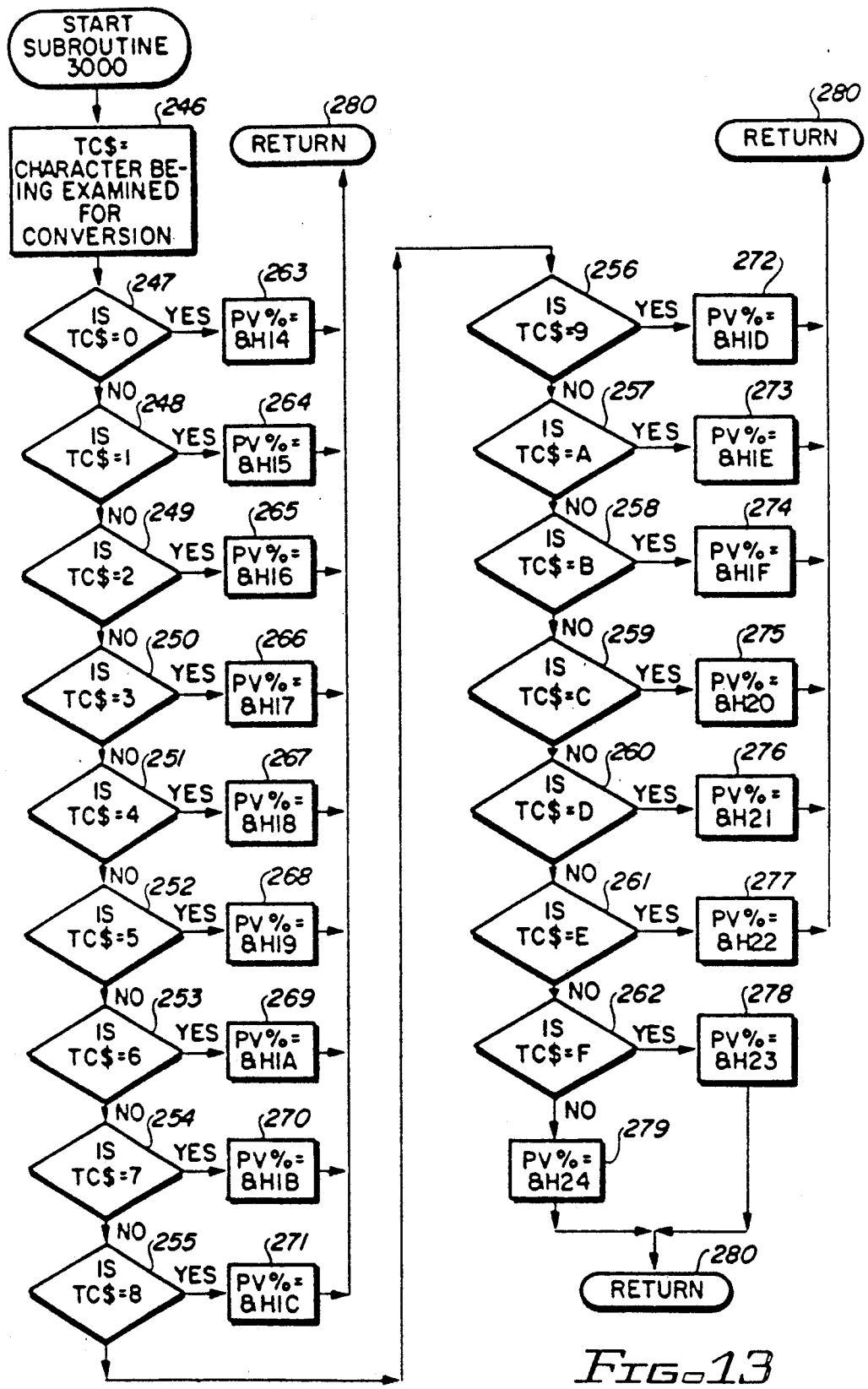
FIG. 13 is a simplified flowchart of subroutine 3000 used by the trunk trace routine of the present invention.

Referring now to FIG. 13, subroutine 3000 will now be described. Each time this subroutine is called by the main program, it converts a single, original hexadecimal number into another number which the application program will later use to pronounce the original hexadecimal number to the telephone holder (see Table IV). The numbers to be converted represent ESNs (which comprises hexadecimal digits from 0 to F) and MIDs (which comprise decimal digits from 0 to 9).

First, task 246 fills the string variable TC$ with the character for which conversion is to be performed. Then, tasks 247-262 attempt to match TC$ to specific hexadecimal values. If a match is found, then one of tasks 263-279 performs a specific conversion, depending upon the value of TC$. After the program finds a match and accomplishes the appropriate conversion, task 280 returns control to the point in the trunk trace routine from where subroutine 3000 was called.

I claim:

1. An apparatus for a cellular telephone system, comprising:
    call routing means, within a cellular switch, for directing a selected call placed by a cellular telephone and received by an input trunk of said cellular switch to an output trunk of said cellular switch, said output trunk being selectively attachable to a dedicated public switched telephone network subscriber line;
    data exchanging means, attached to said cellular switch, for transferring data to and from said cellular switch; and
    computing means, attached to said data exchanging means and to said dedicated public switched telephone network subscriber line, for initiating performance of one or more trunk traces by said switching in order to obtain one or more parameters of such cellular telephone and providing an output of said parameters to said cellular telephone, said output comprising one or more voice messages.

2. An apparatus as recited in claim 1, wherein said computing means comprises:
    central processing means for managing functions of said computing means;
    first means, interposed between said central processing means and said dedicated public switched telephone network subscriber line, for, after establishment of a communications connection between said cellular telephone and said computing means, interactively obtaining information from said cellular telephone and providing an output of said parameters to said cellular telephone; and
    second means, attached to said central processing means, for obtaining said parameters from said switch.

3. An apparatus as recited in claim 1, wherein said data exchanging means comprises:
    means for serially transmitting data between said computing means and a switch port of said cellular switch.

4. An apparatus as recited in claim 1, wherein:
    said output trunk is arranged in direct outward dial, single member trunk group configuration.

5. The apparatus of claim 1, wherein the output signal is provided before said selected call terminates.

6. The apparatus of claim 1, wherein said computing means additionally comprises means responsive to transmission of an authorization code by the cellular telephone after the call is received, for selectively terminating the call in the event that the authorization code fails to match a predetermined number.

7. The apparatus of claim 6, wherein the authorization code comprises a personal identification number.

8. An apparatus as recited in claim 2, wherein:
    said information obtained from said cellular telephone comprises dual tone multi-frequency signals generated by said cellular telephone in response to depression of a keypad of said cellular telephone.

9. The apparatus of claim 8, which further includes means for selectively terminating said selected call in the event that said dual tone multi-frequency signals fail to match a predetermined signal.

10. An apparatus as recited in claim 2, wherein:
    said obtained information comprises audio signals.

11. An apparatus as recited in claim 10, wherein:
    said first means further comprises diagnostic testing means for recording said audio signals and subsequently retransmitting said recorded audio signals to said cellular telephone.

12. A method to access data of a cellular telephone, comprising the steps of:
    receiving at an input trunk of a cellular switch a selected call, from said cellular telephone;
    routing said call to an output trunk of said switch, said output trunk being selectively attachable to a dedicated public switched telephone subscriber line, said line being attached to a computing means;
    interactively exchanging data between said computing means and said cellular telephone via said dedicated public switched telephone network subscriber line and a cellular network associated with said cellular switch;
    in response to said interactive exchanging of data, initiating performance by said cellular switch of one or more trunk traces of said selected call in order to determine one or more parameters of said cellular telephone;
    obtaining said parameters from said cellular switch;
    providing an output of said parameters to said cellular telephone, said output comprising one or more voice messages; and
    terminating said selected call after completion of said step of providing.

13. A method as recited in claim 12, wherein said output trunk of said routing step is arranged in direct outward dial (DOD), single member trunk group configuration.

14. A method as recited in claim 12, wherein said performance of said collecting step employs serial data communications.

15. The method of claim 12, wherein said step of interactively exchanging data provides a diagnostic test of said cellular telephone by performing the steps of recording audio signals received from said cellular telephone and subsequently re-transmitted said recorded audio signals to said cellular telephone.

16. The method of claim 12, wherein the interactively exchanged data comprises dual tone multi-frequency signals generated by said cellular telephone in response to depression of a keypad of said cellular telephone.

17. The method of claim 16, which further includes a step of selectively terminating said selected call in the event that said dual tone multi-frequency signals fail to match a predetermined signal.

18. The apparatus of claim 1 or claim 12 wherein said one or more parameters comprise a mobile telephone number.

19. The apparatus of claim 1 or claim 12 wherein said one or more parameters comprise an electronic security number.

* * * * *